INVENTOR.
HOWARD G. THOMPSON
BY Tweedale & Gerhardt
ATTORNEYS.

United States Patent Office 3,412,811
Patented Nov. 26, 1968

3,412,811
DRAFT CONTROL FOR TRACTOR
Howard G. Thompson, Livonia, Mich., assignor to
Massey-Ferguson Inc., Detroit, Mich.
Filed May 23, 1966, Ser. No. 552,189
7 Claims. (Cl. 172—7)

This invention relates generally to agricultural tractors and is particularly concerned with the automatic control of the working depth of an implement with respect to the tractor to which it is attached.

Tractors having a Ferguson type three-point hitch include those having draft control systems in which the draft or working force developed by the implement drawn by the tractor is maintained relatively constant by increasing and decreasing the working depth of the implement as the draft force decreases or increases, respectively, from a selected value determined by the setting of a manual control lever. The tractor hitch is raised and lowered with respect to the tractor by one or more hydraulic rams or actuators which are usually under control of a valve having supply, neutral and discharge positions. When the valve is in its supply position, the actuators are extended to raise the hitch, and when the valve is in its discharge position, the actuators contract to lower the hitch with respect to the tractor. In the form known as top link control, the top link of the tractor hitch reacts in tension or compression against the draft forces and causes a spring engaged thereby to deflect in proportion to variations in the draft force. The change in deflection of the draft spring acts through a linkage to operate the control valve. This linkage is thus draft responsive.

With the above type of draft control system, the operator selects the draft or working force to be maintained by positioning a manual control lever which adjusts the draft control linkage between the draft responsive linkage and valve such that a particular spring deflection is required to hold the valve in its neutral position. When the draft force increases above the selected value, the spring deflection changes and actuates the valve through the draft control linkage from its neutral to supply position causing the hydraulic rams to extend and raise the hitch and decrease the working depth of the implement until the draft force is reduced sufficiently to return the valve to its neutral position. Conversely, when the draft force decreases from the selected value, the valve is actuated from the neutral to discharge position causing the rams to contract and lower the hitch to increase the working depth until the force returns to the neutral setting.

Many tractors are now capable of pulling implements which are too heavy to be fully supported on the tractor hitch and a portion of the weight must be carried by a ground engaging wheel. Such implements are known as semi-mounted implements. The forward end of this implement is supported on the tractor hitch and the rear end is supported on a tail wheel or other ground support.

Semi-mounted implements have the characteristic of having the front end movable by the tractor linkage up and down with the whole implement pivoting about the rear support wheel. Thus, unlike a fully mounted implement wherein the front and rear of the implement raise up and down together relatively paralled to the ground, the rear end of a semi-mounted implement goes up and down only as the ground support element follows in a raising or lowering furrow and thus such movement is delayed until the plow has moved a substantial distance.

This delayed raising or lowering of the rear of the implement and the rear earth working elements such as plow bottoms, causes a delayed increase or decrease in actual total effective draft forces. Because of this delay the tractor draft control system will react to further change height of the front end of the implement to obtain a greater total change. By the time the tractor and implement have traveled a distance equal to the length of the implement, the rear ground working members are fully effective at the new overall height. This results in too great a total change in draft and the draft control must again adjust itself to raise or lower the implement in the opposite direction.

This overcontrol of the front end of the plow occurs both during turning at the headlands, where the plow is lowered to start a new pass, and also where the soil condition changes from dense to loose soil and vice versa. The overcontrol can be overcome by providing a change or addition to the basic draft control apparatus which will modify the implement depth regulation by the raising and lowering of the hitch. This addition should preferably cause a false draft load signal to act on the main draft sensing element on the tractor so as to cause the system to raise or lower the front end of the plow to a level that will ultimately provide a desired total draft load and a more uniform depth than if a true draft load signal were used. This false load can best be established by modifying the actual draft load in accordance with the change in angular relationship between the plow and tractor or in other words in accordance with the position of the front of the plow with respect to the tractor.

It is therefore an object of the invention to provide a tractor linkage control system wherein the normal draft control system that regulates the depth of operation of an implement in accordance with draft forces is modified to also regulate the depth in accordance with the angular relationship of the linkage with respect to the tractor. A further object is to provide a tractor draft control system that has a greater sensitivity at low draft forces than at higher forces.

Briefly the invention provides an auxiliary spring assembly located adjacent the normal draft control linkage which transmits draft and weight forces from the implement to the normal draft control spring. The auxiliary spring is arranged to provide a force multiplying effect so that changes in draft loads are magnified prior to their effect on the normal draft spring. The auxiliary spring is arranged to have an adjustable preload which will cause all forces less than the preload to be transmitted through the force multiplying linkage to the normal draft spring. Forces greater than the preload are transferred by both the force multiplying linkage and the normal force transmitting means which may be a one to one, reducing or multiplying linkage. The auxiliary spring is arranged so that changes in the angular relationship between the tractor and implement cause the same to be loaded or unloaded and hence provide a false force change on the normal draft spring.

An embodiment of the invention will now be described with reference to the accompanying drawings in which.

Figure 1:
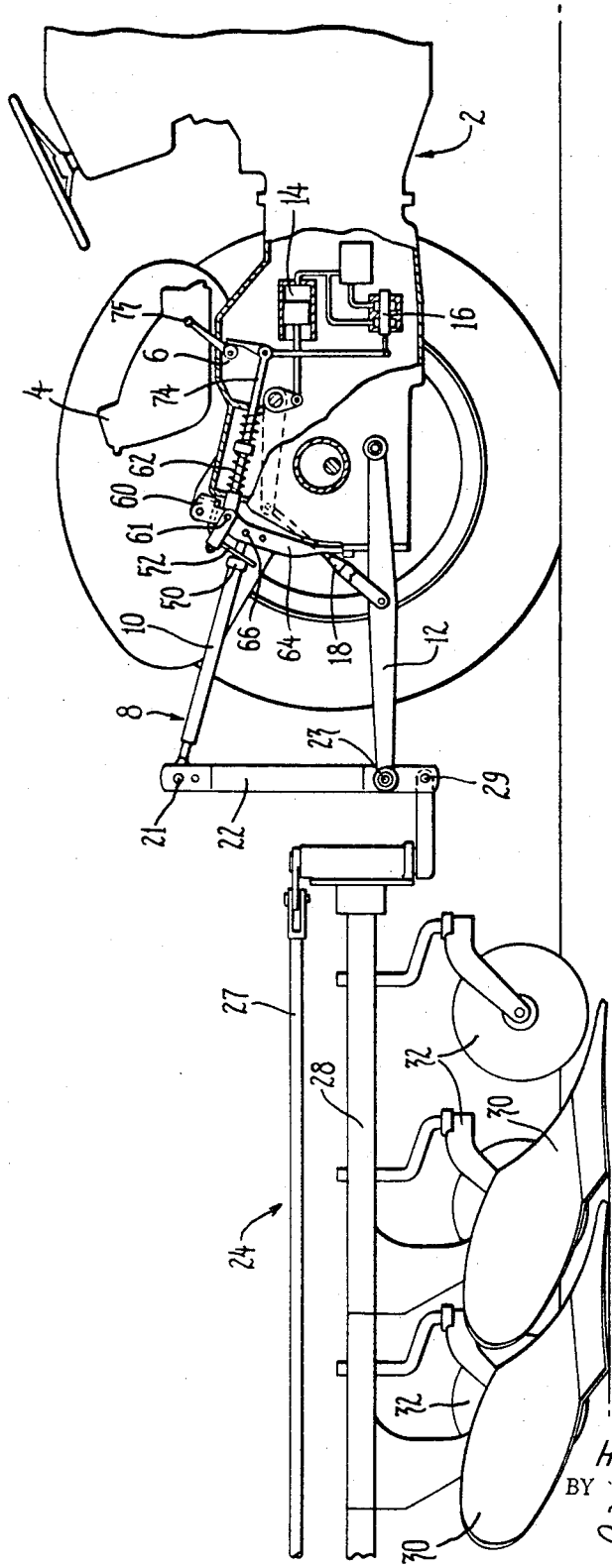
FIG. 1 is a fragmentary side-elevation of a tractor and semi-mounted earth working implement embodying the control system of the present invention with one of the tractor wheels removed for clarity.

In FIG. 1 reference numeral 2 designates a tractor having a seat 4, a control console 6 and a three point hitch linkage designated generally by reference numeral 8. The tractor hitch 8 includes an upper draft control link 10 and a pair of lower draft links 12. Links 10 and 12 each are pivotally connected at their forward ends to the tractor body.

Draft links 12 are actuated vertically with respect to the tractor body by hydraulic actuating means 14 mounted in the tractor body and connected by drop linkage 18 with the lower draft links 12. Hydraulic control means 16 are interposed between draft control setting means 6 and the hydraulic actuating means 14.

The trailing ends of links 10 and 12 are pivotally connected at 21 and 23, respectively, with a mast or A-frame 22 such that control link 10 follows the pivotal movement of the mast 22.

Shown secured to the tractor hitch is a semi-mounted implement 24, for example a plow, having a ground engaging wheel (not shown) for supporting the rear end of the implement. Implement 24 includes a longitudinal frame member 28 pivotally connected at its forward end with the mast or A-frame 22 at 29 beneath the pivot point 23 of draft links 12. The steering link 27 leads to the rear implement wheel so as to steer the semi-mounted earthworking implement when it is turned around at the headlands.

The draft forces generated by plows 30 which are arranged behind a coulter 32 as shown in FIG. 1 tend to cause the A-frame 22 to rotate in a clockwise direction about pivot point 23 and apply a force on the control link 10 and from there to a draft control spring 62.

Figure 2:
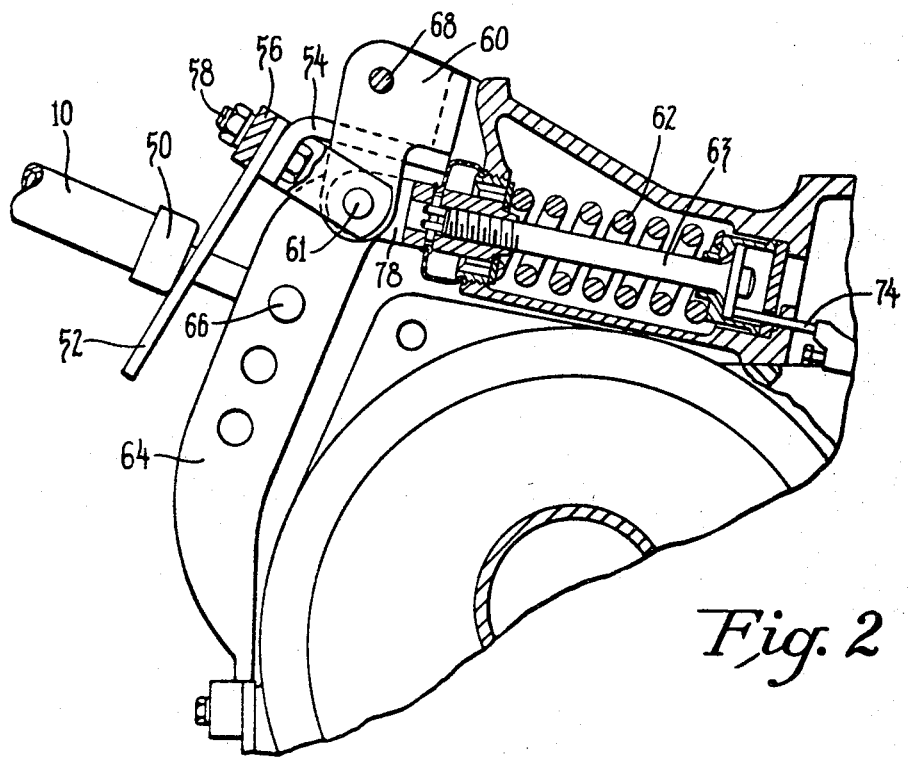
FIG. 2 is a longitudinal section through the assembly which controls the hydraulic system.
Figure 3:
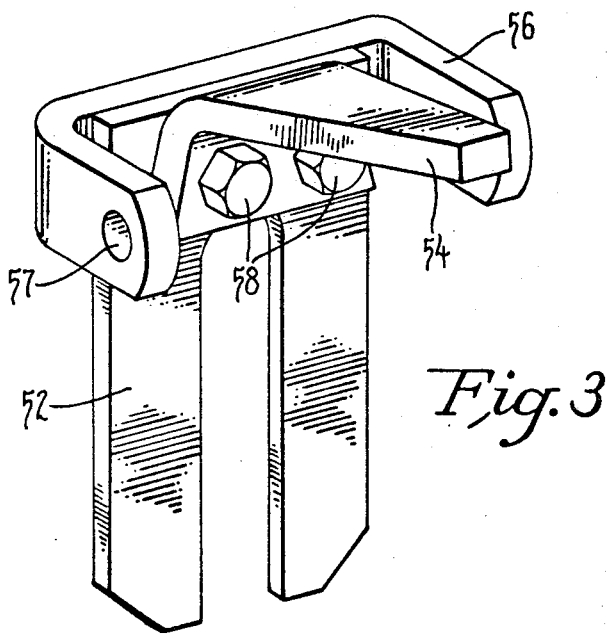
FIG. 3 is a perspective view of the leaf spring and clevis assembly which influences the hydraulic draft force control means upon an up or down movement of the lower draft links.

FIG. 2 shows how the forward end of the control link 10 is pivotally connected to a flexibly mounted tractor control beam 64 by a pin 66, and the beam 64 is pivotally connected with a rocker 60 by means of a pin 61. The rocker 60 in turn is pivotally mounted on the tractor frame at pivot 68. Pin 61 also acts to connect the beam 64 to a yoke 78 into which is threaded a control plunger 63. Movement of the plunger is transmitted to the control linkage 6 and the hydraulic control 16 by a pin 74.

The draft loads which acts on the semi-mounted implement 24 are transferred via the mast 22 and control link 10 to a double acting draft control spring 62. If the draft force decreases on account of the plows 30 moving from dense into loose soil, the mast 22 decreases its clockwise pressure allowing plunger 63 to move to the left causing lowering of the lower draft links 12. Conversely, if the plows 30 move from loose into dense soil, the mast 22 increases its clockwise pressure moving plunger 63 to the right causing lifting of the lower draft links 12.

As shown in FIG. 1, the double acting spring 62 is shown schematically. Movement of the rod 74 acts through linkage to control a three position valve 16. Valve 16 acts to control flow of oil to and from a cylinder 14 having a piston connected to raise and lower the lower links 12. The position of rod 74 required to hold the valve 16 in a central neutral position can be varied by a quadrant lever 75.

As previously mentioned, in a semi-mounted implement, the rear portion thereof, by necessity, follows the movement of the front portion in a delayed wave fashion, particularly at the headlands, it is desirable in case of a semi-mounted implement being pulled by a tractor to modify the effect of the draft force on the trailing implement by making it less sensitive.

In order to diminish a wave-shaped movement of a long semi-mounted plow and to attain a substantially uniform plowing depth regardless of the soil consistency, the present invention provides a supplemental leaf spring and clevis assembly 52–58 for cooperation with a collar part 50 on the upper control link 10.

The auxiliary spring assembly comprises a rear leaf spring 52 which is preferably bifurcated and straddles the upper control link 10, a front leaf spring portion 54 which is firmly connected to a rear leaf spring portion 52 at substantially a right angle thereto and a clevis or yoke 56 at the apex of the two leaf springs, with pivot holes 57. Screw means 58 hold the springs 52, 54 and the clevis 56 together. The assembly is pivotally mounted on the pivot pin 61 which links the tractor control beam 64 with the rocker link 60. The spring portions 54 and 52 together form a lever having an effective fulcrum point at 68, a force application point at 50 and a multiplied force output at 61.

The collar part 50 is adjustable on the upper control link 10 close to the pivot pin 66 and can be moved to provide a preloading between the collar 50 and pin 61. This will unload the force of the linkage acting on pin 66 so that all draft forces in the linkage less than the preload will pass through the spring 52 to the pin 61 and to the yoke 78 and plunger 63. Thus with small draft forces the springs 52 and 62 are effectively in series. It should be noted that the force applied through the spring 52 is multiplied since the spring assembly 52–54 acts as a force multiplying lever. Forces applied through the pin 66 to the beam 64 are in a force dividing or reducing manner.

It will therefore be seen that with small draft forces, acting to move the link 10 to the right, these forces are multiplied before they reach the rod 63. Hence small changes in draft forces will produce relatively large vertical changes in the linkage by the control. After the preload of spring 62 is overcome, i.e. the draft force in the linkage is greater than the preload, the total draft force is partially applied through the multiplying spring 52 and partially through the pin 66 and beam 64.

Movement down of the linkage 10 about pin 66 will cause the collar 50 to force the spring 52 toward the tractor thus applying a greater force to the system than is actually present due to the force components caused by the draft and implement weight forces. Likewise, upward movement of link 10 will allow spring 52 to expand away from the tractor reducing the total force on the system. Hence movement of an implement connected to top link 10 in an upward direction lessens the total force while downward movement increases the force.

For normal operation the collar 50 is adjusted so that there is no deflection of spring 52 when the implement is in transport position. As the implement is lowered into the ground draft loads acting on pin 29 cause the frame 22 to move forward placing the link 10 in compression. As the implement is lowered the collar 50 causes the spring 52 to be loaded. As stated above, where the force on link 10 is less than the preload force of spring 52 the springs 52 and 62 act in series with the spring 52 acting as a force multiplier. Under these conditions the control is relatively sensitive with small changes in draft forces causing relatively larger corrective changes in the linkage. These linkage changes are offset by the fact that the angle change causes a change in the force of spring 52 so that the overall change in depth of the implement is not as much as it would be otherwise.

During heavier draft loads, where the preload of spring 52 (caused by collar 50 compressing the spring during movement down from transport to operating position) is less than the forces in link 10, then the forces are transmitted both through spring 52 and beam 64 to the pin 61 and yoke 78. The effect is to have a system that is not as sensitive as that with lower draft loads. Vertical movement of link 10 still acts to change the loading of spring 52 so that vertical changes in the linkage and hence implement depth changes are not as great as they would be without the spring 52. This has the dual effect of maintaining a more uniform working depth of the implement during soil changes as well as a better control of the initial entry of the implement into the ground such as at the headlands.

It should be pointed out that the addition of the invention provides a further advantage in that it can operate to either extend the tension range of a double acting internal draft control spring like the spring 62. Where heavy overhung fully mounted implements are used, the spring 52 can be loaded by collar 50 sufficiently to pre-compress the spring 62, whereby even where the top link 10 is in substantial tension the spring 62 will either be in compression or at least in a lower tension condition. Further-more the invention can be used with a single acting spring to provide a tension range usable with its heavy overhung implements.

It will be apparent from the above that the invention provides a number of advantages with a relatively simple auxiliary structure that can be added to existing tractors to increase the effectiveness and capabilities of the same. The auxiliary spring assembly can be left on the tractor and used or not used at will merely by adjusting collar 50 fore and aft on the link 10. The degree of effectiveness of the auxiliary spring can also easily be set by such adjustment.

It will be obvious to those skilled in the art to modify or change the structure from that shown within. The scope of the invention which is limited only by the following claims.

I claim:

1. In a tractor having an implement draft linkage controlled by a hydraulic lift system, first spring means, first force transmitting means connecting said linkage to said first spring means to cause the same to deflect in accordance with draft loads in the linkage, control means responsive to the deflection of said first spring means by said linkage for controlling the raising and lowering of the linkage by the lift system, second force transmtting means including second spring means connecting said linkage with said first spring means and effective to vary the draft load in the linkage required to cause a predetermined deflection in said first spring, and means carried by said linkage to vary the deflection of said second spring means in accordance with changes in the angular relationship between the linkage and the tractor so that said control means is operated in acocrdance with changes in draft loads as well as changes in the angular relationship between the links and the tractor.

2. The tractor of claim 1 wherein said second force transmitting means provide a force multiplication ratio of forces between said linkage and said spring different than that provided by said first force transmitting means.

3. The tractor of claim 2 wherein said second force transmitting means is arranged to transmit all draft forces less than that required to overcome a predetermined preloading of said second spring means and wherein draft forces greater than said predetermined loading are transmitted through both of said force transmitting means.

4. The tractor of claim 3 wherein the said predetermined preloading of said second spring varies with changes in the angular relationship of the linkage with respect to the tractor.

5. The tractor of claim 4 wherein the degree of preloading of said second spring at any particular angular relationship of the linkage with respect to the tractor can be preset by the tractor operator.

6. The tractor of claim 1 wherein said tractor includes a housing located near the rear thereof, said first spring means and control means located within said housing, said draft linkage and said first and second force transmitting means located outside of said housing and control rod means connected to said first and second force transmitting means and extending into said housing for operative connection to said first spring means and said control means.

7. The tractor of claim 6 wherein said second spring means comprises a spring member pivoted near its center on the external end of said control rod and having a first spring portion extending from the pivot engageable with an adjustable element on the draft linkage and a second spring portion extending from the pivot and engaging the tractor wherein said second spring means forms a first class lever and wherein movement of said element on the draft linkage by either changes in draft force or changes in angular relationship will apply a force to said control rod.

References Cited

UNITED STATES PATENTS

| 2,460,847 | 2/1949 | Schwarz | 172—10 |
| 3,022,832 | 2/1962 | Marindin | 172—10 |
| 3,167,133 | 1/1965 | Annat | 172—7 |

FOREIGN PATENTS

| 1,477,855 | 3/1967 | France. |

ABRAHAM G. STONE, *Primary Examiner.*

J. R. OAKS, *Assistant Examiner.*